United States Patent
Parlow et al.

(10) Patent No.: US 9,527,453 B2
(45) Date of Patent: Dec. 27, 2016

(54) TRIM ASSEMBLY HAVING STORAGE COMPARTMENT WITH TRAP DOOR

(71) Applicant: FORD GLOBAL TECHNOLOGIES, LLC, Dearborn, MI (US)

(72) Inventors: Kathleen M. Parlow, Columbus, MI (US); Nicholas Alphonse Billardello, Macomb, MI (US); Kevin Preuss, Berkley, MI (US); Scott Holmes Dunham, Redford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/602,733

(22) Filed: Jan. 22, 2015

(65) Prior Publication Data

US 2016/0221513 A1  Aug. 4, 2016

(51) Int. Cl.
| | |
|---|---|
| *B60R 7/06* | (2006.01) |
| *B60R 7/12* | (2006.01) |
| *B60R 11/02* | (2006.01) |
| *B60R 13/02* | (2006.01) |
| *E05D 3/02* | (2006.01) |
| *B60R 11/00* | (2006.01) |

(52) U.S. Cl.
CPC ............. *B60R 7/12* (2013.01); *B60R 11/0241* (2013.01); *B60R 13/025* (2013.01); *E05D 3/02* (2013.01); *B60R 2011/0022* (2013.01); *B60R 2013/0287* (2013.01)

(58) Field of Classification Search
CPC ...... B60R 11/00; B60R 11/0241; B60R 13/02; B60R 2011/0052; B60R 2011/0063; B60R 2011/0075; B60R 2011/0078; B60R 2011/0082; B60R 2011/0085; B60R 2013/0287; B60R 7/12; B29C 45/1635; B29C 45/1676; B29C 70/76; B60N 2/4606; B60N 2/466; B60N 3/102
USPC .... 296/37.1, 37.12, 37.8; 224/539, 549, 553
See application file for complete search history.

(56) References Cited

U.S. PATENT DOCUMENTS

| | | | | |
|---|---|---|---|---|
| RE21,441 E | * | 4/1940 | Visser ..................... | B60N 3/08 224/278 |
| 2,221,959 A | * | 11/1940 | Visser ..................... | A24F 19/06 131/235.1 |
| 2,982,393 A | * | 5/1961 | Erbst ..................... | B60N 3/12 206/246 |

(Continued)

FOREIGN PATENT DOCUMENTS

| | | |
|---|---|---|
| DE | 19727007 B4 | 4/2010 |
| EP | 1974966 A3 | 5/2009 |

(Continued)

OTHER PUBLICATIONS

English machine translation of the description for DE19727007.
English machine translation of the description for EP1974966.
English machine translation of the description for KR100219469.

*Primary Examiner* — Glenn Dayoan
*Assistant Examiner* — Sunsurraye Westbrook
(74) *Attorney, Agent, or Firm* — Vichit Chea; King & Schickli, PLLC

(57) ABSTRACT

A trim assembly is provided for a motor vehicle. The trim assembly includes a trim panel, a storage compartment in the trim panel and a trap door. The trap door divides the storage compartment into a first chamber and a second chamber.

18 Claims, 12 Drawing Sheets

(56) References Cited

U.S. PATENT DOCUMENTS

| | | | | |
|---|---|---|---|---|
| 3,940,016 A | * | 2/1976 | Krakauer | G07F 11/42 221/129 |
| 6,692,053 B1 | * | 2/2004 | Smith | B60N 3/102 224/282 |
| 7,004,526 B2 | * | 2/2006 | Herbold | B60R 11/02 296/187.05 |
| 7,188,882 B2 | | 3/2007 | Dry | |
| 7,393,037 B2 | * | 7/2008 | Hwang | B60R 7/02 224/400 |
| 8,172,297 B2 | * | 5/2012 | Rhee | B60R 7/06 296/24.34 |
| 8,474,895 B2 | * | 7/2013 | Michisaka | B62J 17/02 296/37.1 |
| 8,590,837 B2 | * | 11/2013 | Schneider | B64D 11/003 244/118.1 |
| 2007/0241582 A1 | | 10/2007 | McKeever | |
| 2008/0073927 A1 | | 3/2008 | Schoemann et al. | |
| 2008/0143144 A1 | * | 6/2008 | Yustick | B62D 21/157 296/187.03 |

FOREIGN PATENT DOCUMENTS

| | | | |
|---|---|---|---|
| FR | EP841216 A1 * | 10/1997 | B60Q 3/06 |
| KR | 100219469 B1 | 9/1999 | |

\* cited by examiner

TRIM ASSEMBLY HAVING STORAGE COMPARTMENT WITH TRAP DOOR

TECHNICAL FIELD

This document relates generally to the motor vehicle equipment field and, more particularly, to a trim assembly incorporating a storage compartment having a trap door dividing the storage compartment into first and second chambers.

BACKGROUND

Motor vehicle users are always looking for convenient places to store and hold personal items such as wallets, cell phones, electronics, flashlights, sports equipment such as golf balls, suntan lotion, eye drops and the like. In many cases the typical storage options designed into motor vehicles, including, for example, glove boxes, console bins, console cup holders, instrument panel, center stack storage compartments, door map pockets, seatback pockets and the like either do not provide enough dedicated storage or are simply not versatile enough to provide the best possible option. Further, these dedicated storage options are typically fixed and non-configurable to best meet the needs of the user. Further, most are focused upon storage within reach of the driver or front row passenger and are not conveniently available to rear seat occupants. As a result it is clear that a need exists for additional storage options in the interior trim of a motor vehicle.

SUMMARY

In accordance with the purposes and benefits described herein, a trim assembly is provided for a motor vehicle. That trim assembly comprises a trim panel, a storage compartment in the trim panel and a trap door dividing the storage compartment into a first chamber and a second chamber. In one embodiment, the trap door is pivotally mounted to the trim panel and displaceable between an open position and a closed position.

A latch and cooperating stop are carried on the trim panel. The trap door is captured between the stop and latch when in the closed position. In one possible embodiment, the stop is a lug and the latch is a resilient lip. In one possible embodiment, the trap door includes an aperture functioning as a finger pull. In another possible embodiment, the assembly further includes a biasing element for biasing the trap door into an open position. Further the assembly includes a latch mechanism for securing the trap door in the closed position and an actuator for releasing the latch mechanism and allowing the biasing element to displace the trap door into the open position. That biasing element may comprise a torsion spring.

In another possible embodiment, the assembly includes a biasing element for biasing the trap door into a closed position. This embodiment further includes a stop holding the trap door against the biasing element in the closed position.

In one possible embodiment the assembly further includes a first access opening in the trim panel. The first access opening is in communication with the first chamber. Further, the assembly includes a second access opening the trim panel. The second access opening is in communication with the second chamber. In one possible embodiment the first chamber is oriented above the second chamber and the first access opening is oriented above the second access opening.

In one possible embodiment, the trim panel includes a front wall and a rear wall. The first access opening is provided between the front wall and the rear wall. Further a slot is provided in the front wall. The slot is open to the first access opening and is in communication with the first storage compartment. In one possible embodiment, the slot is tapered and has a wider end adjacent the first access opening. In one possible embodiment, the front wall includes retention lips along the margin of the slot. These resilient retention lips function to hold objects such as electronic devices in the slot where they may be conveniently accessed by an occupant of the motor vehicle.

In one possible embodiment, the front wall includes multiple living hinges that function with the slot, add flexibility to the front wall and expandability to the first access opening. This increases the versatility of the storage compartment for receiving and holding items such as an umbrella or the like. In one possible embodiment these multiple living hinges run parallel to the slot.

In the following description, there are shown and described several preferred embodiments of the trim assembly. As it should be realized, the trim assembly is capable of other, different embodiments and its several details are capable of modification in various, obvious aspects all without departing from the trim assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the trim assembly and together with the description serve to explain certain principles thereof. In the drawing figures.

Reference will now be made in detail to the present preferred embodiments of the trim assembly, examples of which are illustrated in the accompanying drawing figures.

DETAILED DESCRIPTION

Figure 1:
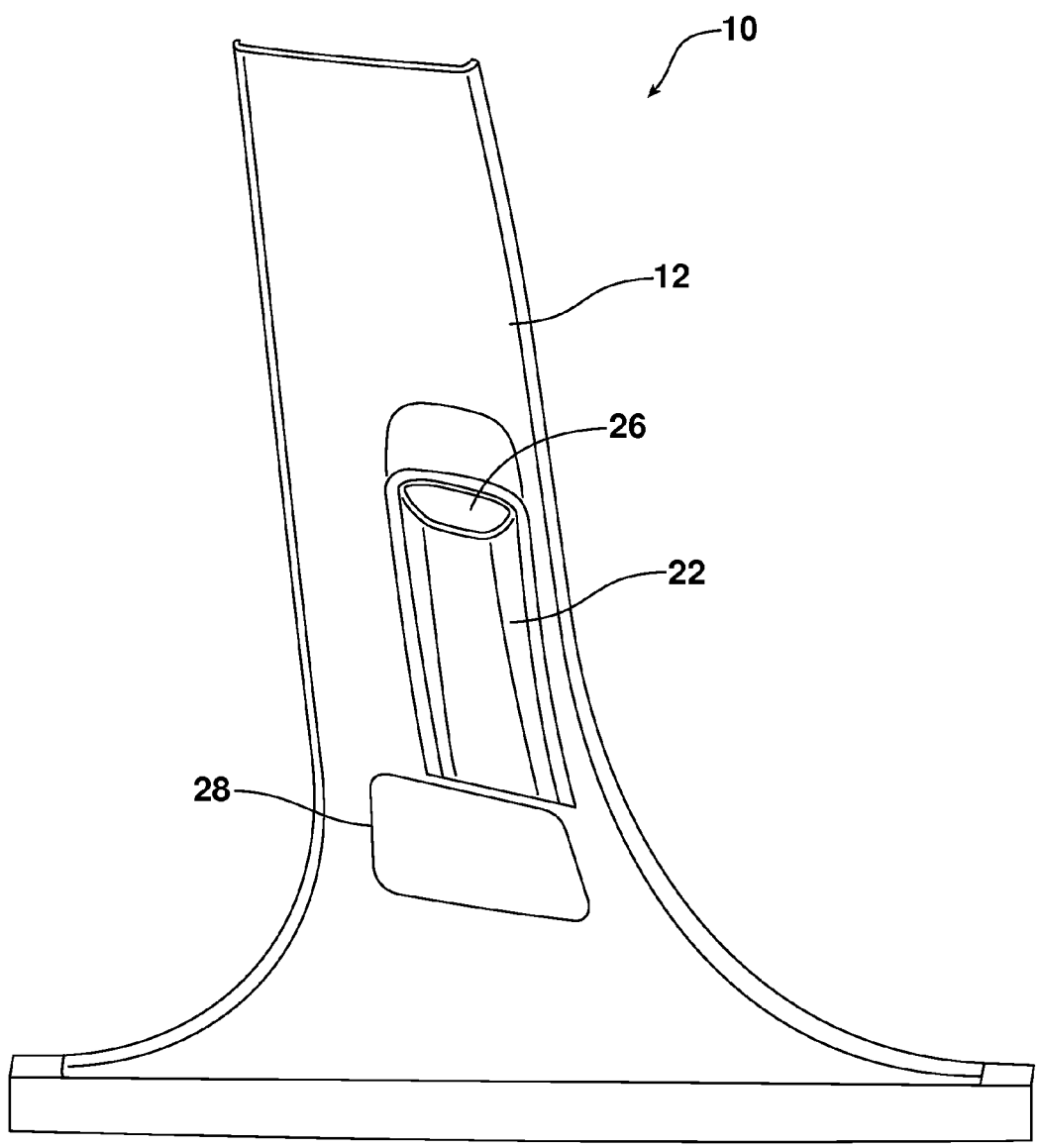
FIG. 1 is a perspective view of a first embodiment of the trim assembly clearly showing the first and second access openings that are provided in the trim panel.
Figure 1A:
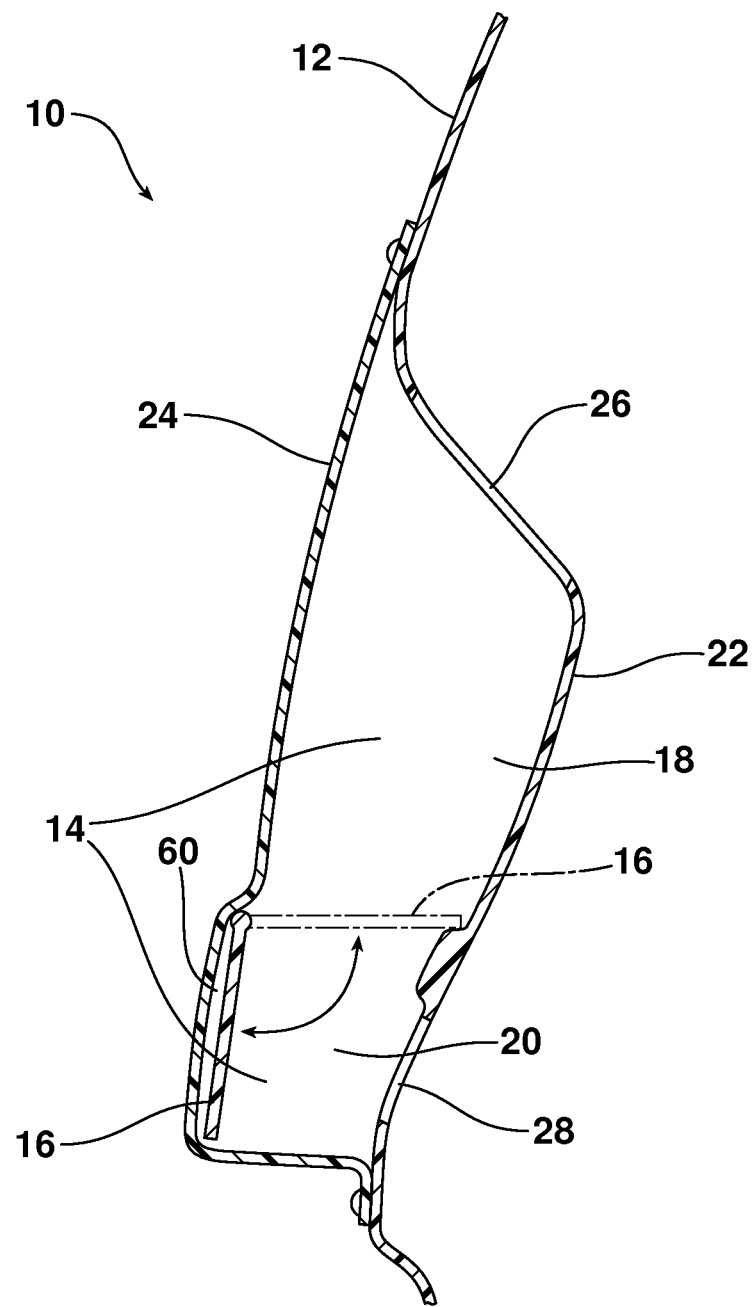
FIG. 1a is a schematic cross-sectional view illustrating the storage compartment and trap door dividing that storage compartment into first and second chambers.
Figure 1B:
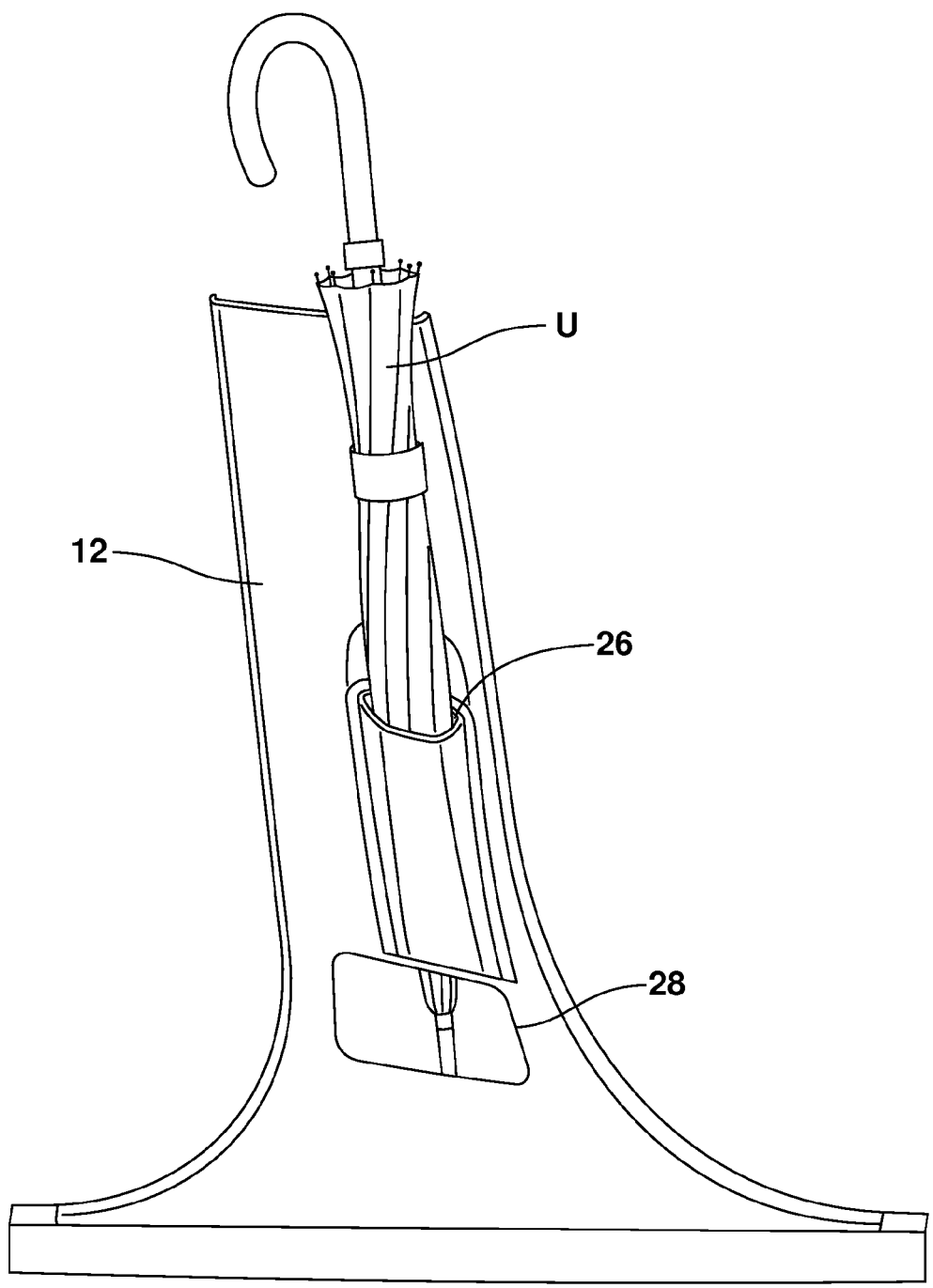
FIG. 1b is a view similar to FIG. 1 but showing an umbrella received in the storage compartment of the trim assembly.

Reference is now made to FIGS. 1, 1a and 1b illustrating a first embodiment of the trim assembly 10 for a motor vehicle. As illustrated, the trim assembly 10 includes a trim panel 12 which defines a storage compartment 14. That storage compartment 14 is divided by a trap door 16 into a first or upper chamber 18 and a second or lower chamber 20.

As illustrated, the trim panel 12 includes a front wall 22 and a rear wall 24. A first access opening 26 is provided between the front and rear walls 22, 24 and is in communication with the first or upper chamber 18. A second access opening 28 in the trim panel 12 is provided in communication with the second or lower chamber 20. As should be appreciated, the first chamber 18 is oriented over the second chamber 20 and the first access opening 26 is oriented over the second access opening 28 in the illustrated embodiment.

As illustrated in FIG. 1a, the trap door 16 is pivotally mounted to the trim panel 12 and displaceable between an open position (illustrated in full line), wherein the first and second chambers 18, 20 are opened to each other, and a closed position (illustrated in phantom line) wherein the first and second chambers are divided by the trap door. The trap door 16 serves two functions. First, the trap door 16 may be opened in order to help remove objects and debris that are dropped into the storage compartment 14 through the access opening 26 but are too short for or otherwise difficult to remove through that opening. More specifically, when the trap door 16 is opened, the item or debris drops into the second chamber 20 where it may be more easily accessed and removed through the larger, second access opening 28.

Second, when one inserts a long item such as an umbrella into the first access opening 26, the trap door 16 may be pushed open thereby combining the two chambers 18, 20 and effectively forming a single, deep storage compartment 14 that is able to conveniently receive and store an object that could not be as effectively stored if the first are upper chamber 18 had a solid bottom wall instead of the trap door. Note the umbrella U held in the compartment 14 as illustrated in FIG. 1b.

Figure 2:
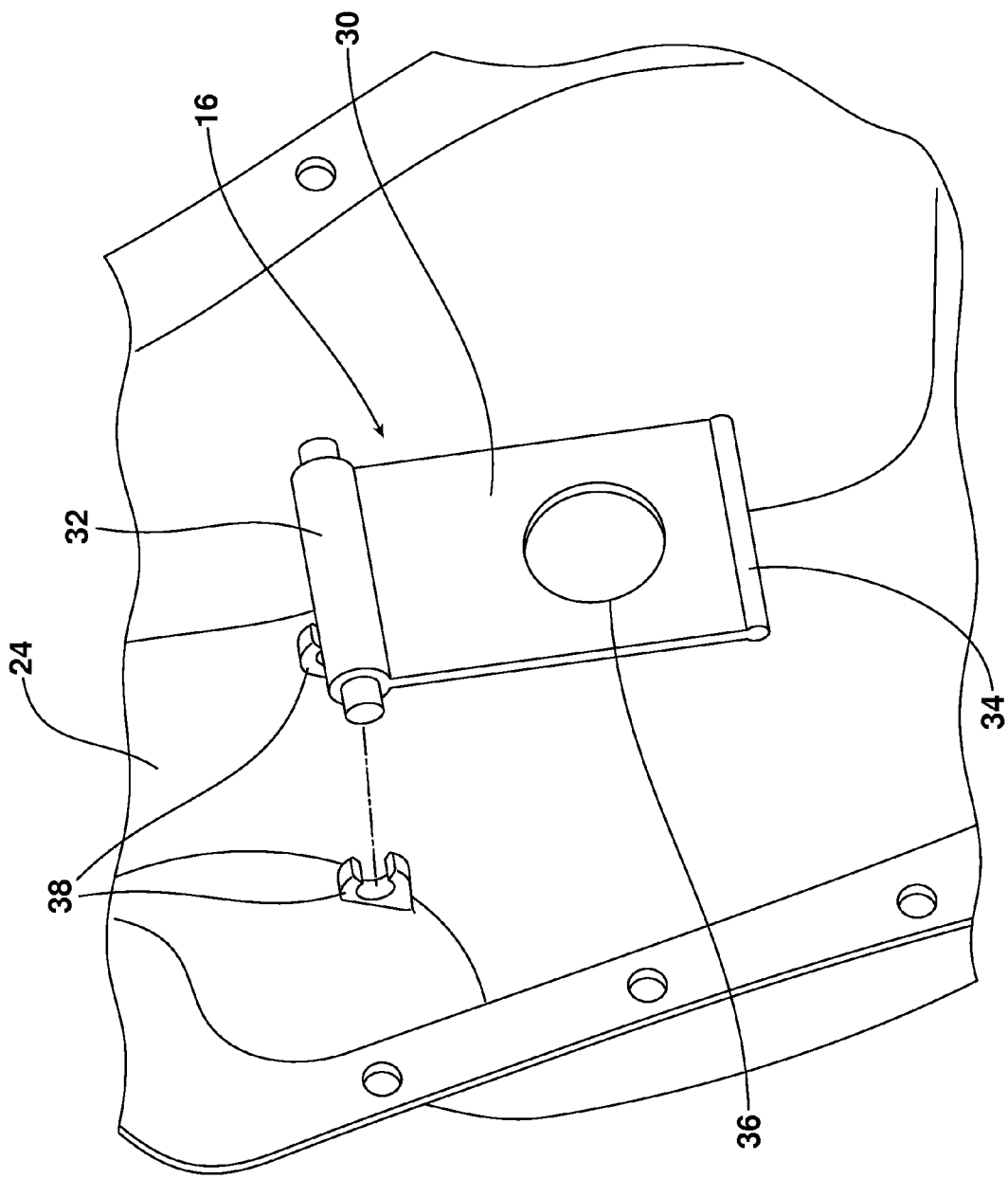
FIG. 2 is a detailed, exploded perspective view illustrating the pivotal mounting of the trap door in one possible embodiment.

A first embodiment of the trap door 16 is illustrated in FIGS. 2-5. As best shown in FIG. 2, the trap door 16 comprises a body 30 having a trunnion mounting 32 at one end and a rounded bead 34 at the other. A finger pull, in the form of an aperture 36 is provided in the body 30 between the trunnion mounting 32 and the bead 34.

Figure 3:
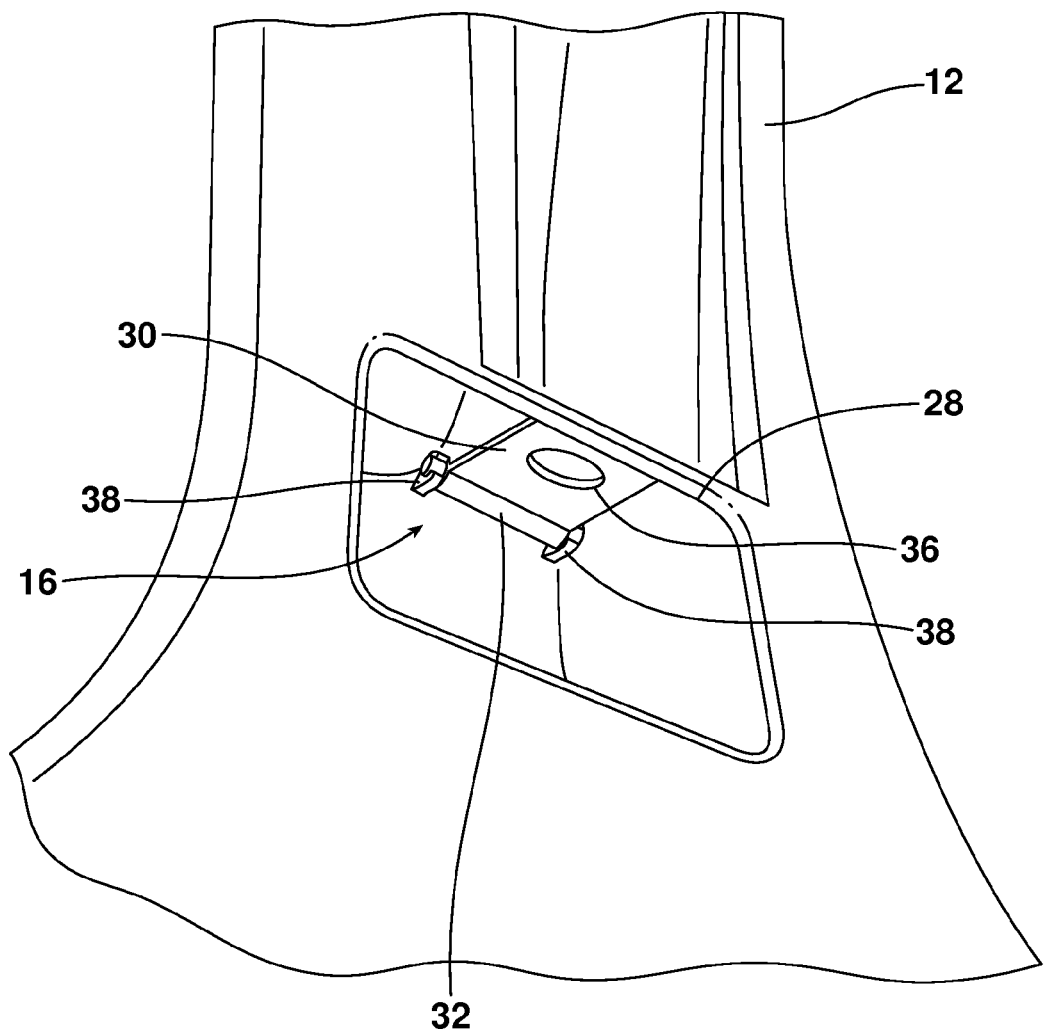
FIG. 3 is a detailed perspective view from below illustrating the trap door of the FIG. 2 embodiment in the closed position.
Figure 4:
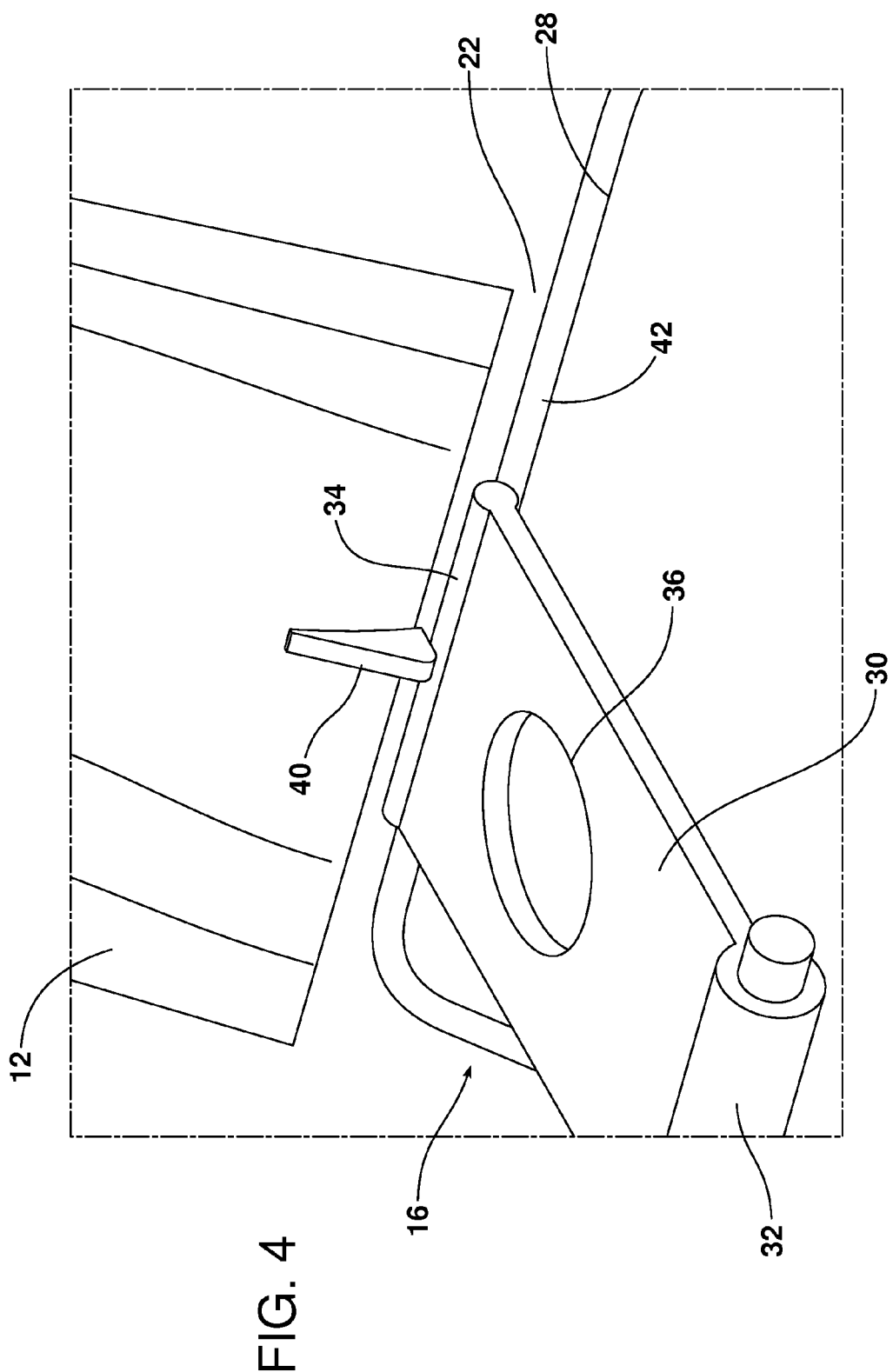
FIG. 4 is a detailed perspective view illustrating how the trap door of the FIG. 2 embodiment is captured between a stop and a resilient lip when in the closed position.
Figure 5:
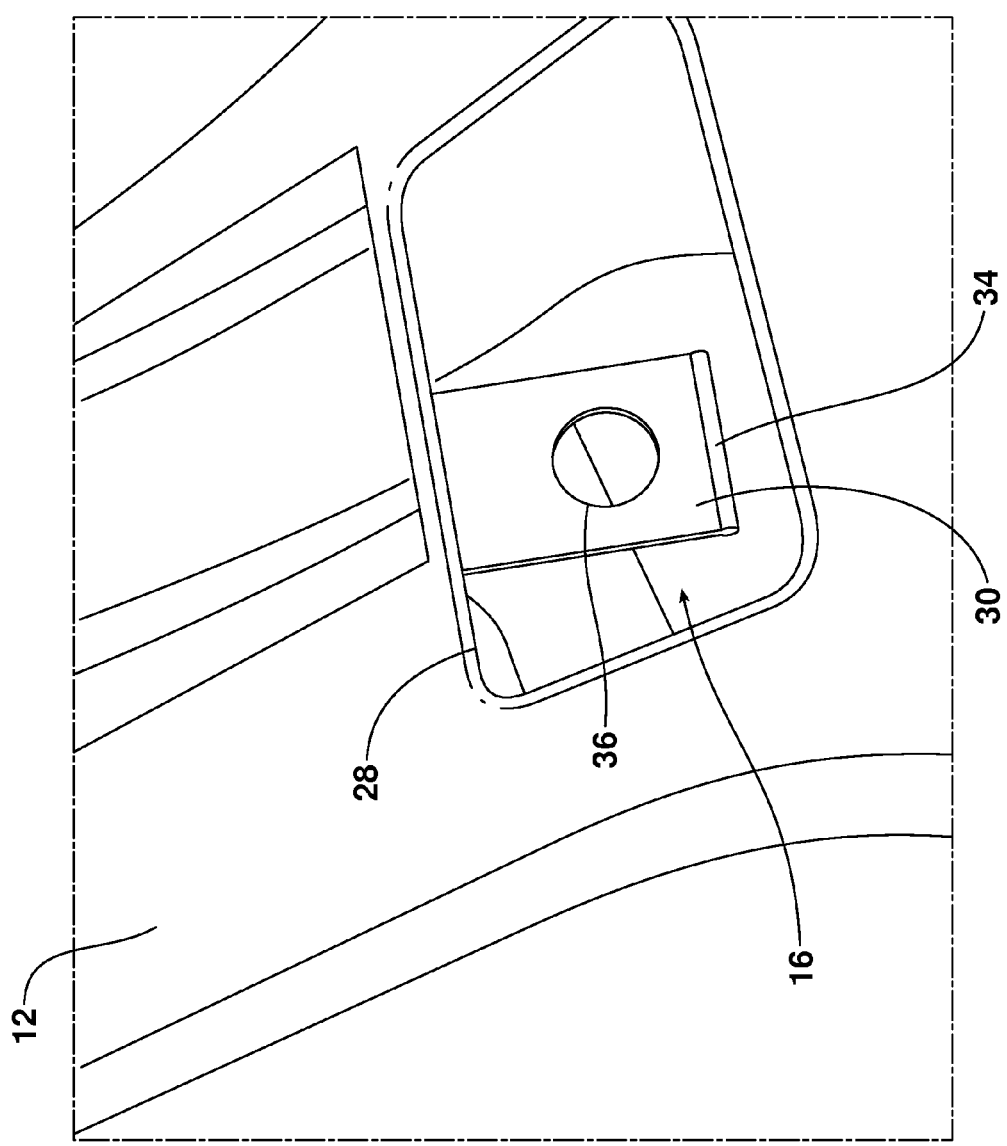
FIG. 5 is a perspective view through the second access opening illustrating a finger pull aperture in the trap door which is shown in the open position.

As further illustrated in FIG. 2, the trunnion mounting 32 snaps into the cooperating cradle 38 molded into the rear wall 24 of the trim panel 12 so that the trap door 16 may freely pivot between the open and closed positions. FIG. 3 is a bottom view of the hidden trap door 16 when in the closed position dividing the storage compartment 14 into the first and second chambers 18, 20. FIG. 4 illustrates how the rounded bead 34 at the end of the body 30 opposite the trunnion mounting 32 is captured between a stop in the form of a lug 40 and a resilient ledge or lip 42 carried on the front wall 22 of the trim panel 12. When one wishes to open the trap door 16, one reaches a finger up through the second access opening 28, inserts that finger into the finger pull aperture 36 and pulls the trap door 16 downward so that the trap door pivots into the open position illustrated in FIG. 5.

Figure 6:
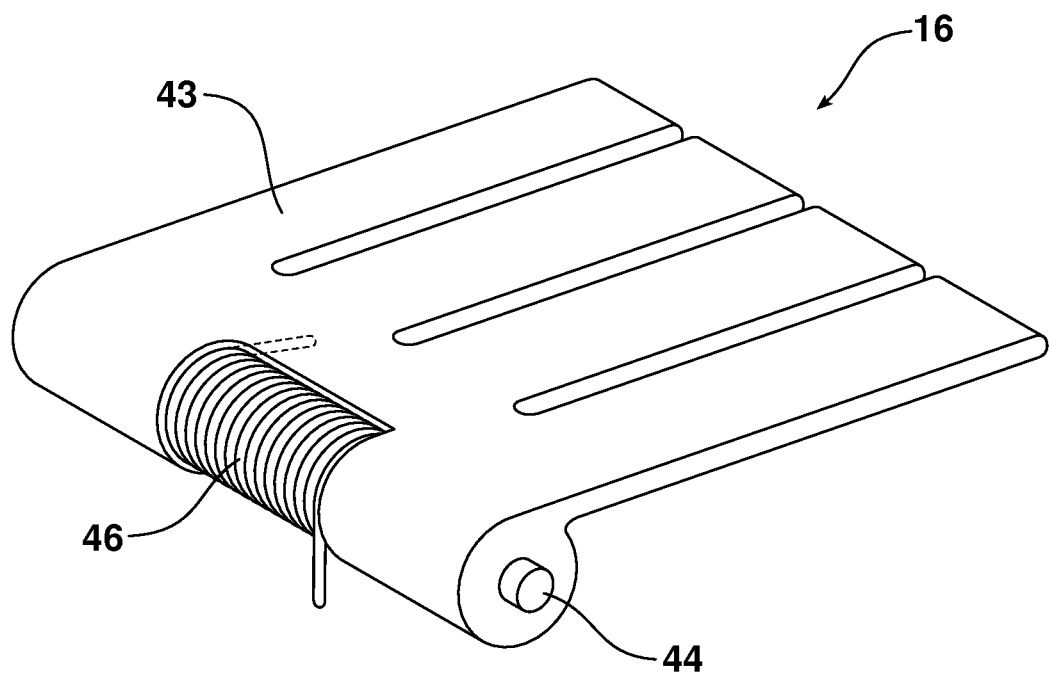
FIG. 6 is a detailed perspective view illustrating a torsion spring used to bias the trap door into the closed position in one embodiment and into the open position in another embodiment.
Figure 7:
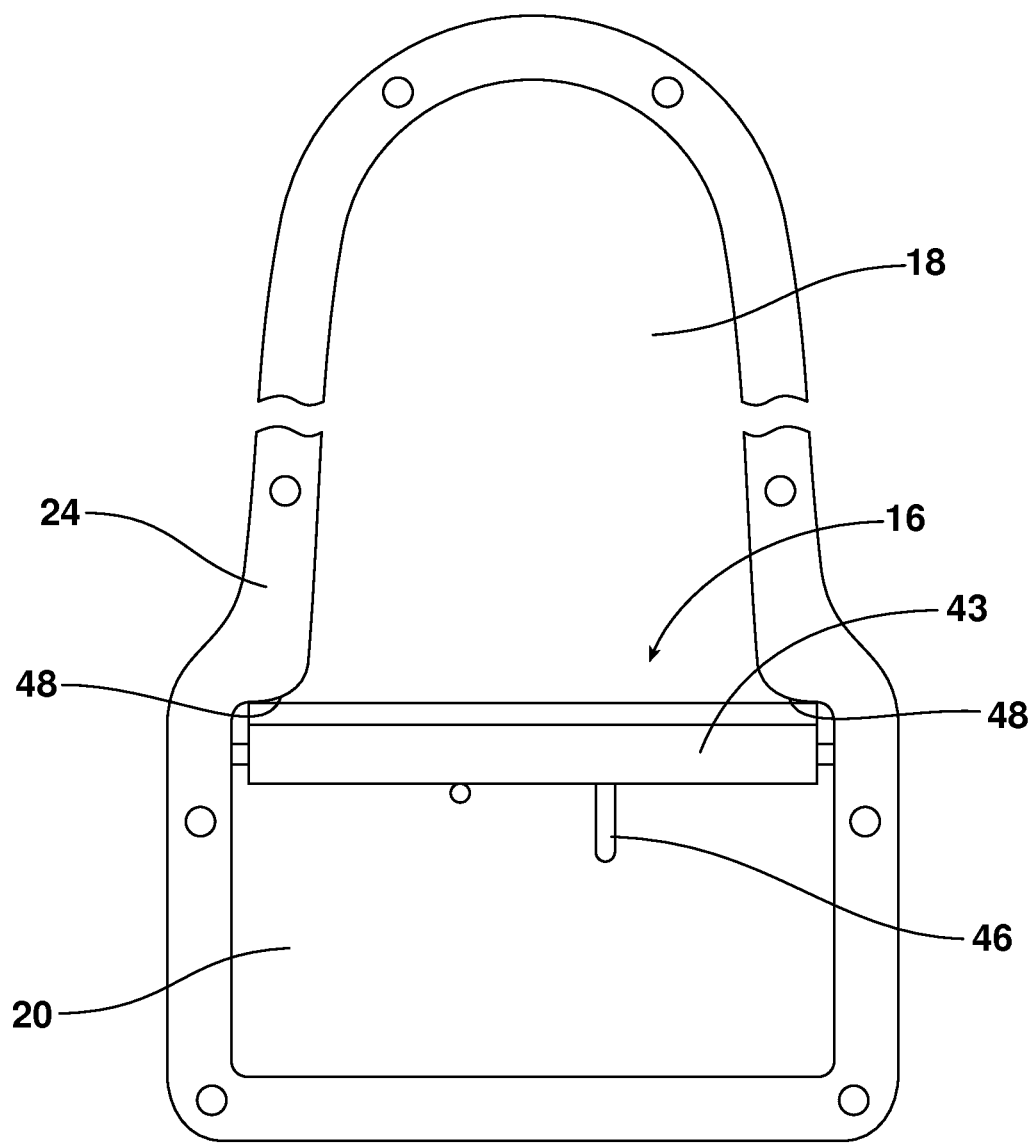
FIG. 7 is a detailed view of a trap door embodiment wherein the torsion spring biases the trap door into a closed position against a stop in the form of a compartment shoulder.

A second embodiment of trap door 16 is illustrated in FIG. 6. This trap door 16 includes a body 43 that receives an axle 44 at one end. That axle 44 is received in a cooperating cradle such as illustrated at 38 in FIGS. 2 and 3 and functions as a pivot point for the trap door 16. As illustrated, the axle 44 passes through and captures a biasing element in the form of a torsion spring 46. In the embodiment illustrated in FIG. 7, that torsion spring 46 biases the trap door 16 into a closed position wherein the body 43 of the trap door is held against a stop in the form of a shoulder 48 molded into the trim panel 12. In this embodiment, the torsion spring 46 provides a force of approximately 5 to 10 Newton so that objects may be stored in the first or upper chamber 18 above the trap door 16 without the trap door collapsing downward and opening into the lower chamber 20. Such a force may, however, be easily overcome when one inserts a long item such as an umbrella into the first access opening 26 and then pushes downwardly against the trap door as desired.

Figure 8:
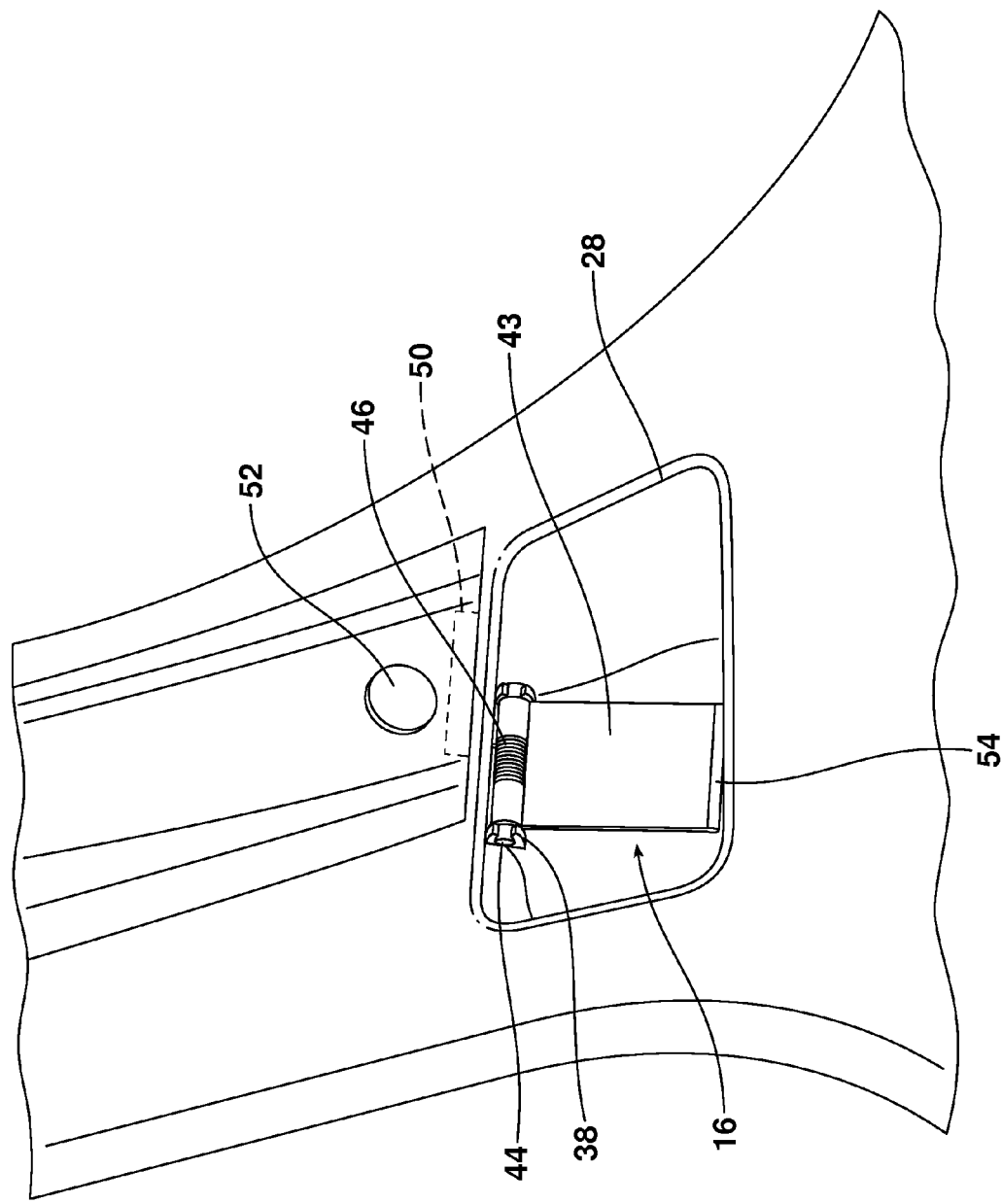
FIG. 8 is a perspective view illustrating an embodiment incorporating an actuator, in the form of a pushbutton, that is pushed to allow the biasing spring to bias the trap door into the open position illustrated.

In the embodiment illustrated in FIG. 8, the biasing element or torsion spring 46 biases the trap door 16 into the open position. More specifically, in this embodiment the trap door 16 is held in a closed position by a latching mechanism schematically illustrated by reference numeral 50 in FIG. 8. When one wishes to release the trap door so that the torsion spring 46 biases it into the open position illustrated in FIG. 8, one simply pushes the actuator button 52 which causes the latch 50 to open. When one wishes to re-close the trap door 16, one reaches a finger through the second access opening 28, engages the bead 54 of the trap door body 43 and pivots the trap door about the axle 44 held in the cradle 38 until the bead 54 on the trap door is once again captured by the latch 50.

In any of the illustrated embodiments, the rear wall 24 of the trim panel 12 may include a recess or offset 60 to receive the trap door 16 when in the open position. See FIG. 1a. When the trap door 16 is received back in the recess 60, a straight rear wall is formed when the door is opened. This aids in the extraction of the long items from the storage compartment 14.

Figure 9:
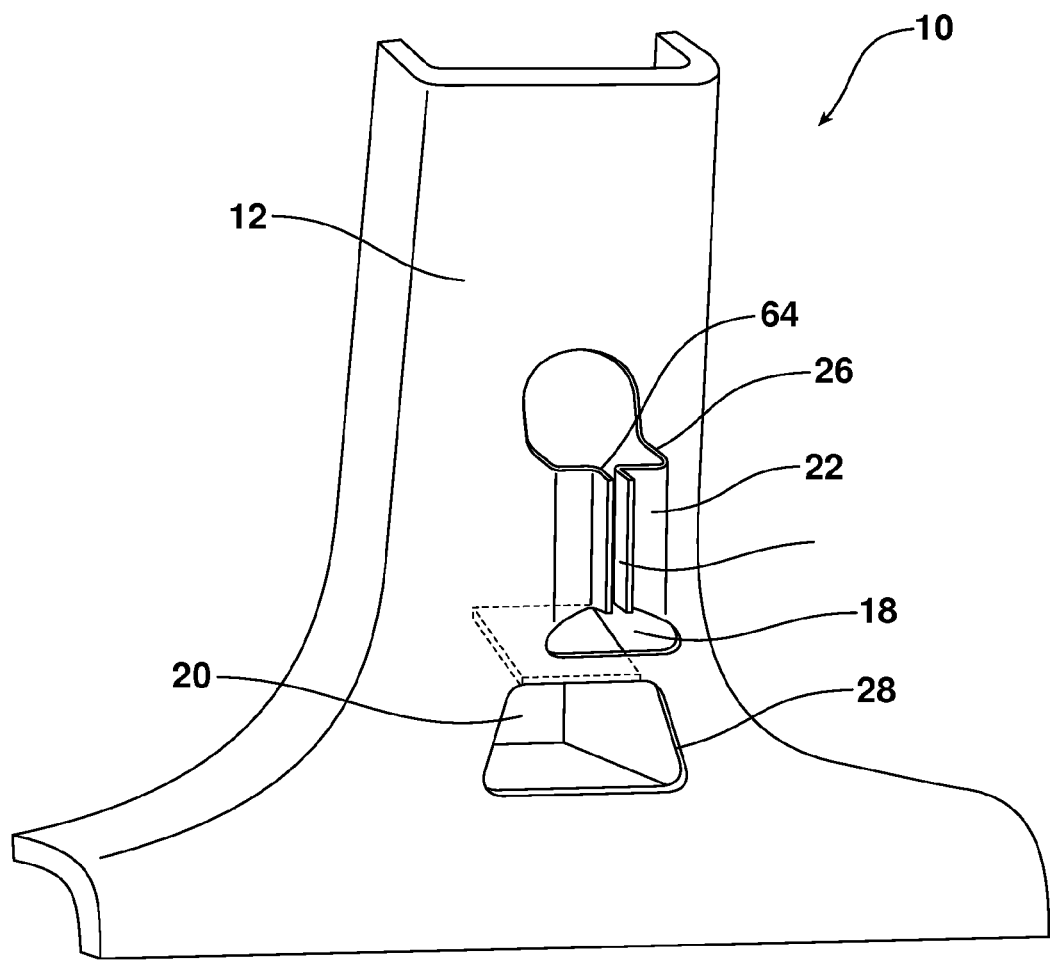
FIG. 9 is a perspective view of yet another embodiment of the trim assembly incorporating a retention slot in the front wall that is open to the first access opening and in communication with the first compartment of the storage chamber above the trap door.
Figure 10:
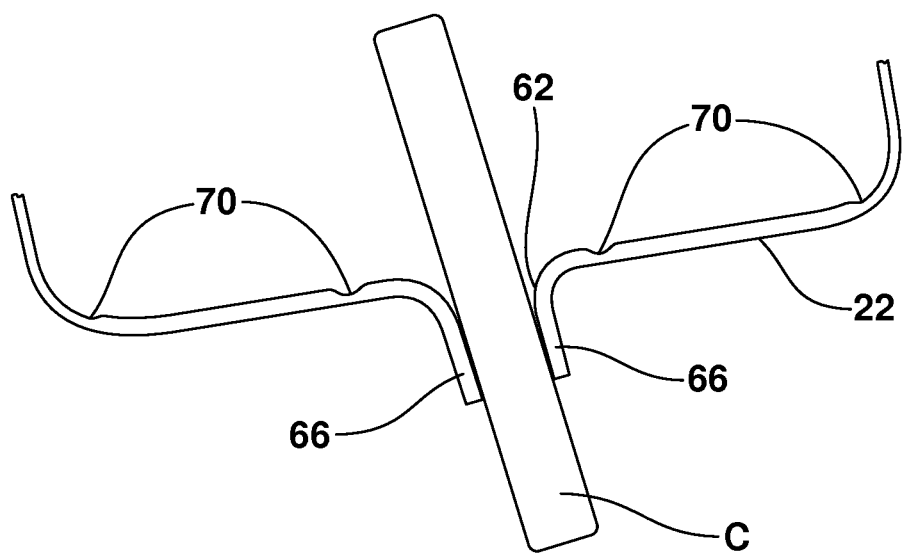
FIG. 10 is a detailed cross-sectional view of the front wall illustrating the retention lips along the margin of the slot that are resilient and are able to grip an electronic device such as the illustrated cell phone as well as the multiple living hinges in the front wall that add greater flexibility so that it may expand to hold larger items.

Reference is now made to FIGS. 9 and 10 illustrating yet another embodiment of the trim assembly 10. In this embodiment the front wall 22 of the trim panel 12 includes a tapered slot 62 that is opened to the first access opening 26 and is in communication with the first chamber 18. As illustrated, the wider end 64 of the tapered slot 62 is provided at the top where the tapered slot needs the first access opening 26. As should be appreciated, an item such as an electronic device (note cell phone C illustrated in FIG. 10) may be easily inserted into the top end 64 of the slot 62 and pushed downward until the narrowing tapered slot firmly engages and holds the item in position. Here it should be noted that the front wall includes resilient retention lips 66 along a margin of the slot 62 so that the cell phone C is securely and conveniently held in place in the slot.

As further illustrated in FIG. 10, multiple living hinges 70 are provided at spaced locations along the front wall 22. These living hinges 70 may run parallel to the slot 62. Together the living hinges 70 and the slot 62 function to add flexibility to the front wall 22 and expandability to the first access opening 26 so it may receive a bulky item such as an umbrella. Advantageously, the resilient front wall 22 is characterized by a spring memory that causes the wall to hug the umbrella or other oversized item and prevent it from vibrating or rattling when it is held in the storage compartment 14.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A trim assembly for a motor vehicle, comprising:
a trim panel;
a stop carried on said trim panel;
a storage compartment in said trim panel; and
a trap door dividing said storage compartment into a first chamber and a second chamber, whereby the trap door is pivotally mounted to said trim panel and displaceable between an open position and a closed position and the trap door is configured to be pushed open to combine the first chamber and the second chamber.

2. The assembly of claim 1, further including a latch carried on said trim panel whereby said trap door is captured between said stop and said latch when in said closed position.

3. The assembly of claim 2, wherein said stop is a lug and said latch is a resilient lip.

4. The assembly of claim 3, wherein said trap door includes an aperture functioning as a finger pull.

5. The assembly of claim 1, further including a biasing element for biasing said trap door into the open position.

6. The cup holder system of claim 5, further including a latch mechanism for securing said trap door in said closed position and an actuator for releasing said latch mechanism and allowing said biasing element to displace said trap door into said open position.

7. The assembly of claim 6, wherein said biasing element is a torsion spring.

8. The assembly of claim 1, further including a biasing element for biasing said trap door into the closed position.

9. The assembly of claim 8, wherein the stop holds said trap door against said biasing element in said closed position.

10. The assembly of claim 1, further including a first access opening in said trim panel, said first access opening being in communication with said first chamber.

11. The assembly of claim 1, further including a second access opening in said trim panel, said second access opening being in communication with said second chamber.

12. The assembly of claim 11, wherein said first chamber is oriented above said second chamber and said first access opening is oriented above said second access opening.

13. The assembly of claim 12, wherein said trim panel includes a front wall and a rear wall, said first access opening being provided between said front wall and said rear wall.

14. The assembly of claim 13, further including a slot in said front wall, said slot being open to said first access opening and in communication with said first storage chamber.

15. The assembly of claim 14, wherein said slot is tapered and has a wider end adjacent said first access opening.

16. The assembly of claim 15, wherein said front wall includes retention lips along a margin of said slot.

17. The assembly of claim 16, wherein said front wall includes multiple living hinges that function with said slot to add flexibility to said front wall and expandability to said first access opening.

18. The assembly of claim 17, wherein said multiple living hinges run parallel to said slot.

* * * * *